(12) United States Patent
Song

(10) Patent No.: US 11,635,106 B1
(45) Date of Patent: Apr. 25, 2023

(54) ADSORPTION STRUCTURE

(71) Applicant: Sucteasy LLC, Sheridan, WY (US)

(72) Inventor: Fuchuang Song, Sheridan, WY (US)

( * ) Notice: Subject to any disclaimer, the term of this patent is extended or adjusted under 35 U.S.C. 154(b) by 0 days.

(21) Appl. No.: 17/975,906

(22) Filed: Oct. 28, 2022

(51) Int. Cl.
*F16B 47/00* (2006.01)
*F16M 13/02* (2006.01)

(52) U.S. Cl.
CPC ............ *F16B 47/00* (2013.01); *F16M 13/022* (2013.01)

(58) Field of Classification Search
CPC ...... F16B 47/00; F16B 47/006; F16M 13/022
USPC .................................. 248/206.2, 205.5, 309.3
See application file for complete search history.

(56) References Cited

U.S. PATENT DOCUMENTS

| | | | |
|---|---|---|---|
| 8,480,044 B2 * | 7/2013 | Liao | F16B 47/00 269/95 |
| 8,979,046 B2 * | 3/2015 | Woo | F16M 13/02 248/205.8 |
| 9,732,785 B2 * | 8/2017 | Kobayashi | F16B 47/00 |
| 11,391,317 B2 * | 7/2022 | Liu | F16B 47/00 |
| 11,415,166 B2 * | 8/2022 | Scanlon | F16B 47/003 |
| 11,542,980 B2 * | 1/2023 | Zimmerman | F16B 47/00 |

* cited by examiner

*Primary Examiner* — Todd M Epps

(57) ABSTRACT

The present disclosure provides an adsorption structure. The adsorption structure includes an adsorption member, a negative pressure mechanism, a starting mechanism and a release mechanism. The adsorption member is used for adsorbing other objects. A first cavity provided with an opening is formed in the adsorption member. The opening of the first cavity is used for forming a sealing structure with surfaces of other objects. The negative pressure mechanism is provided with a second cavity for generating a negative pressure, and the second cavity is communicated with the first cavity. The starting mechanism, is used for starting the negative pressure mechanism. The release mechanism is used for balancing a pressure intensity in the first cavity and an atmospheric pressure to enable the adsorption member to release an adsorbed object.

18 Claims, 9 Drawing Sheets

ADSORPTION STRUCTURE

CROSS-REFERENCE TO RELATED APPLICATIONS

The application claims priority of Chinese patent application 2022211591147, filed on 2022 May 13, which is incorporated herein by reference in its entireties.

TECHNICAL FIELD

The present disclosure relates to the technical field of connection devices, in particular, to an adsorption structure.

BACKGROUND

As a connection device, an adsorption structure is widely used to fix objects in daily life. An object is fixed at a preset position of a user through the adsorption of the adsorption structure. When users use an adsorption structure to fix an object, there are diversified demands for the adsorption structure.

In the prior art, when fixing an object at a preset position of a user, the adsorption structure achieves a fixing effect using natural adsorption. The fixing achieved by the natural adsorption is easily affected by an external force, so that the object is loosened, deviates or falls off relative to the adsorption structure. To remove the object fixed on the adsorption structure, the user needs to overcome the adsorption action of the adsorption structure, which is not convenient to remove the object.

In the prior art, the adsorption structure cannot stably fix an object, and the object fixed on the adsorption structure is inconvenient to remove, so the above problems in the prior art need to be solved.

SUMMARY

In order to solve the above problems that a current adsorption structure cannot stably fix an object and the object fixed on the adsorption structure is inconvenient to remove, this patent provides an adsorption structure.

The present disclosure adopts the following technical solution: an adsorption structure, including: an adsorption member, used for adsorbing other objects, wherein a first cavity provided with an opening is formed in the adsorption member; the opening of the first cavity is used for forming a sealing structure with surfaces of other objects; a negative pressure mechanism, wherein the negative pressure mechanism is provided with a second cavity for generating a negative pressure, and the second cavity is communicated with the first cavity; a starting mechanism, used for starting the negative pressure mechanism; and a release mechanism, used for balancing a pressure intensity in the first cavity and an atmospheric pressure to enable the adsorption member to release an adsorbed object.

Further, the adsorption member adopts a suction cup, and a through hole communicated with the second cavity is formed in a bottom of the suction cup.

Further, the negative pressure mechanism includes a cylinder and a driving mechanism for driving the cylinder; the cylinder is communicated with the second cavity; and when working, the cylinder enables the second cavity to generate a negative pressure.

Further, the driving mechanism adopts a motor; an output rotating shaft of the motor is connected with a crank; the cylinder includes a cylinder body, a piston and a piston rod; the crank is connected to and drives the piston rod; and when the negative pressure mechanism works, the motor drives the piston to move back and forth through the crank to extract gas in the second cavity.

Further, the starting mechanism adopts a mechanical switch; and an action portion of the mechanical switch is at least partially located on an outer side of a surface of the adsorption structure.

Further, the action portion of the mechanical switch is located inside or beside the adsorption member; and an action direction of the mechanical switch and an orientation of the opening of the adsorption member are in the same direction, so that when the adsorption structure is close to the adsorbed object, the action portion is pressed by the adsorbed object to act to start the negative pressure mechanism.

Further, the mechanical switch adopts a bidirectional starting switch; and the mechanical switch is used for switching on and starting the negative pressure mechanism when the action portion is pressed and released, so as to automatically start the negative pressure mechanism when the adsorbed object is loosened.

Further, the action portion is provided with a rack; the mechanical switch further includes a micro switch and a gear meshed with the rack; a bulge is arranged on a circumference of the gear; and when the action portion acts, the bulge is used for triggering the micro switch to start the negative pressure mechanism.

Further, the mechanical switch is a travel switch; and the travel switch is used for starting the negative pressure mechanism when the action portion reaches a preset position.

Further, the mechanical switch includes a photoelectric sensing and triggering portion; the action portion includes a light passing hole or a light shielding portion; the photoelectric sensing and triggering portion includes a photoelectric sensor; and when the light passing hole or the light shielding portion is detected, the photoelectric sensing and triggering portion is used for triggering the switch to start the negative pressure mechanism.

Further, the photoelectric sensing and triggering portion is connected with a starting switch; the starting switch is used for switching on a power supply circuit of the photoelectric sensing and triggering portion when the action portion acts; the action portion includes a push portion; the push portion is arranged on one side of the starting switch; and the push portion is used for pushing the starting switch when the action portion acts.

Further, the starting mechanism adopts a touch-control switch; and a touch-control portion of the touch-control switch is arranged on a side surface of the adsorption structure.

Further, the starting mechanism adopts a magnetically controlled switch; the magnetically controlled switch includes an action portion and a fixed portion; one of the action portion and the fixed portion is provided with a hall sensor, and the other one of the action portion and the fixed portion is provided with a magnet; the action portion is used for contacting an object to be adsorbed and is pushed by the object to be adsorbed; and the magnetically controlled switch is used for starting and stopping the negative pressure mechanism according to a magnetic field intensity detected by the hall sensor.

Further, the starting mechanism adopts a sensor switch; the sensor switch includes a sensor component; the sensor component is at least one of a photosensitive sensor, a distance sensor and an infrared sensor; and the sensor component is used for triggering the sensor switch when covered, so as to start the negative pressure mechanism.

Further, the sensor component is arranged on a surface of the adsorption structure and is located on one side of the adsorption member, so that the sensor is covered when the object to be adsorbed is close to the adsorption member, thus starting the negative pressure mechanism.

Further, the release mechanism includes a push switch; the push switch includes a pressing portion and a sealing portion; the pressing portion is exposed from a surface of the adsorption structure; when the sealing portion is movably hermetically connected to an inner wall of the first cavity, so that when the pressing portion is pressed, the first cavity is opened to balance the pressure intensity in the first cavity and the atmospheric pressure.

Further, the adsorption structure further includes a pressure detection switch; and the pressure detection switch is arranged in the second cavity or on a side wall of the second cavity, so as to stop the negative pressure mechanism when a pressure intensity in the second cavity reaches a first preset value.

Further, the pressure detection switch is further used for starting the negative pressure mechanism when the pressure intensity in the second cavity changes from the first preset value into a second preset value.

The present disclosure has the beneficial effects: the negative pressure mechanism generates a negative pressure through the second cavity to enable the adsorption member to generate negative pressure adsorption, the adsorption effect of which is better than that of natural adsorption. Secondly, the first cavity with the opening is formed in the adsorption member. Since the first cavity forms the sealing structure with the surfaces of other objects, the pressure intensity and atmospheric pressure of the first cavity will remain different from an external pressure intensity and atmospheric pressure. Thus, the adsorption member can be stably and fixedly adsorbed on the surfaces of other objects. In addition, the second cavity is communicated with the first cavity, so that the negative pressure mechanism can adjust a negative pressure absorption strength of the adsorption member by adjusting a negative pressure intensity of the second cavity. The starting mechanism and the release mechanism respectively control the adsorption and release of the adsorption structure, and a user can independently control the adsorption and release of the adsorption structure in a use process.

DETAILED DESCRIPTION OF THE EMBODIMENTS

Figure 1:
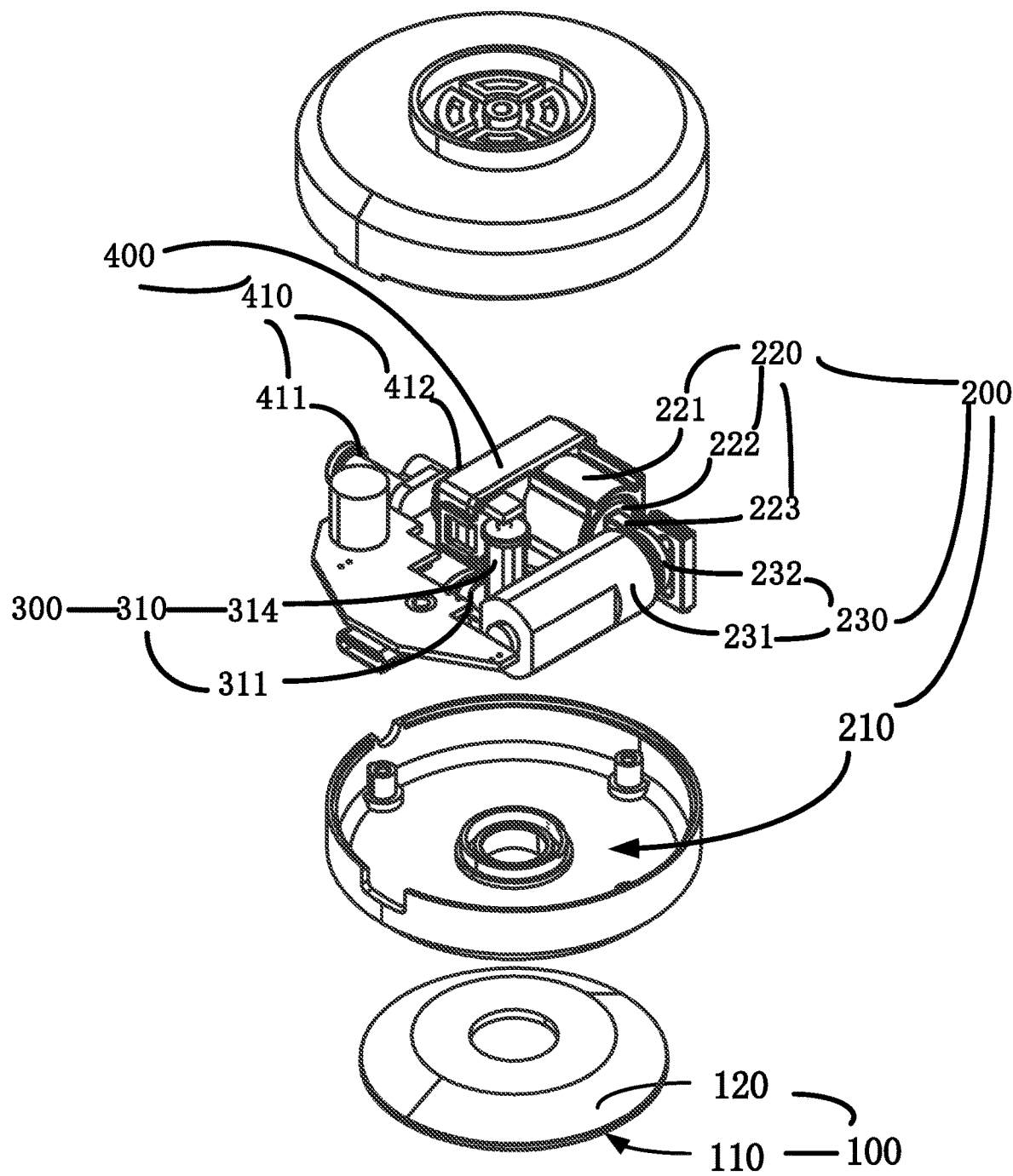
FIG. 1 is an exploded diagram of an adsorption structure according to an embodiment of the present disclosure.

Referring to FIG. 1, the adsorption structure includes an adsorption member 100, a negative pressure mechanism 200, a starting mechanism 300 and a release mechanism 400. The adsorption member 10 is used for adsorbing other objects. A first cavity 110 provided with an opening is formed in the adsorption member 100. The opening of the first cavity 110 is used for forming a sealing structure with surfaces of other objects. The negative pressure mechanism 200 is provided with a second cavity 210 for generating a negative pressure, and the second cavity 210 is communicated with the first cavity 110. The starting mechanism 300 is used for starting the negative pressure mechanism 200. The release mechanism 400 is used for balancing a pressure intensity in the first cavity 110 and an atmospheric pressure to enable the adsorption member 100 to release an adsorbed object.

In this embodiment, the negative pressure mechanism 200 generates a negative pressure through the second cavity 210 to enable the adsorption member 100 to generate negative pressure adsorption, the adsorption effect of which is better than that of natural adsorption. Secondly, the first cavity 110 with the opening is formed in the adsorption member 100. Since the first cavity 110 forms the sealing structure with the surfaces of other objects, the pressure intensity and atmospheric pressure of the first cavity 110 will remain different from an external pressure intensity and atmospheric pressure. Thus, the adsorption member 100 can be stably and fixedly adsorbed on the surfaces of other objects. In addition, the second cavity 210 is communicated with the first cavity 110, so that the negative pressure mechanism 200 can adjust a negative pressure absorption strength of the adsorption member 100 by adjusting a negative pressure intensity of the second cavity 210. The starting mechanism 300 and the release mechanism 400 respectively control the adsorption and release of the adsorption structure, and a user can independently control the adsorption and release of the adsorption structure in a use process.

It should be noted that the above adsorption member 100 has a different adsorption effect from an ordinary adsorption member, so its structure is also different from that of the ordinary adsorption member. The above adsorption member 100 needs to satisfy that the first cavity 110 is communicated with the second cavity 210, so as to achieve the negative pressure adsorption effect. The embodiment of the present disclosure does not limit the specific implementation of the adsorption member 100 that meets the above requirements. To facilitate understanding, the embodiment of the present disclosure provides two implementations, including implementation I where the adsorption member 100 is a suction cup 120, and implementation II where the suction member 100 is a sealing ring.

To facilitate understanding, the above two implementations are described in detail below in combination with the drawings.

Implementation I: The Adsorption Member 100 is a Suction Cup 120

Figure 6:
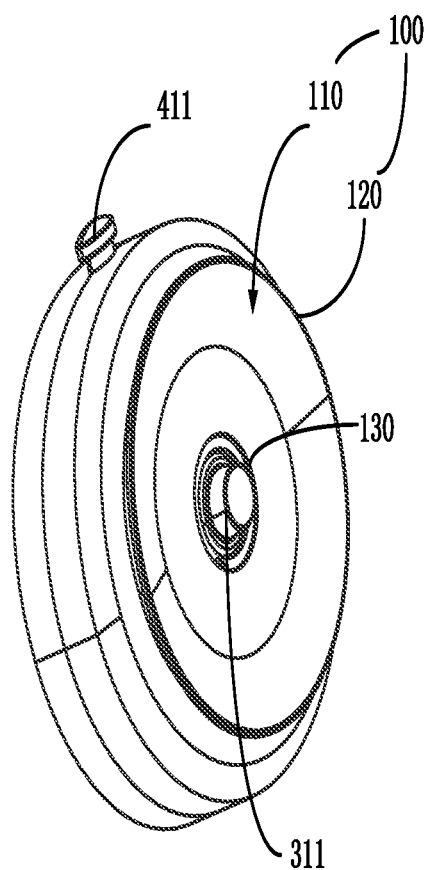
FIG. 6 is a schematic diagram of an adsorption structure according to an embodiment of the present disclosure.

Referring to FIG. 1 and FIG. 6, the adsorption member 100 adopts a suction cup 120. A through hole 130 communicated with the second cavity 210 is formed in a bottom of the suction cup 120.

In this embodiment, the adsorption member 100 adopts the suction cup 120. The through hole 130 communicated with the second cavity 210 is formed in the bottom of the suction cup 120. The suction cup 120 is a flexible material, so that when the first cavity 110 forms the sealing structure with the surfaces of other object, the sealing structure has a good sealing performance to keep the pressure intensity and atmospheric pressure in the first cavity 110 unchanged. Secondly, the suction cup 120 can be adsorbed on different contact surfaces, such as a spherical surface and a concave surface. The through hole 130 communicated with the second cavity 210 is formed in the bottom of the suction cup 120, which will not affect the adsorption effect of the adsorption member 100 and can also meet the requirement of communicating the first cavity 110 with the second cavity 210.

Implementation II: The Suction Member 100 is a Sealing Ring.

Referring to FIG. 1 and FIG. 6, the adsorption member 100 is a sealing ring (not shown in the figure). The first cavity 110 is formed on an inner side of the sealing ring. The adsorption structure is provided with a through hole 130 at the inner side of the sealing ring, and the through hole 130 communicates the first cavity 110 with the second cavity 210.

In this embodiment, the adsorption member 100 is the sealing ring. The first cavity 110 is formed on an inner side of the sealing ring. The adsorption structure is provided with the through hole 130 at the inner side of the sealing ring, and the through hole 130 communicates the first cavity 110 with the second cavity 210. The manufacturing cost of the sealing ring is relatively low. At the same time, the sealing ring is elastic. When the adsorption member 100 achieves the negative pressure adsorption, the sealing ring is pressed by the adsorption structure and other objects, so that there is no gap between the adsorption member 100 and the surfaces of other objects, and the first cavity 110 forms the sealing structure with the surfaces of other objects. In addition, the through hole 130 is arranged on the inner side of the sealing ring, which also meets the requirement of communicating the first cavity 110 with the second cavity 210.

It should be noted that the reason why the adsorption member 100 of the adsorption structure generates the negative pressure adsorption effect is that the first cavity 110 is communicated with the second cavity 210, and the second cavity 210 generates a negative pressure. There are various implementations that the second cavity 210 generates a negative pressure. For example, an inverter provides the negative pressure, or a negative pressure power converter generates the negative pressure. The embodiment of the present disclosure does not limit the specific implementation that the second cavity 210 generates a negative pressure. To facilitate understanding, the embodiment of the present disclosure provides one implementation.

Referring to FIG. 1, the negative pressure mechanism 200 includes a cylinder 220 and a driving mechanism 230 for driving the cylinder 220. The cylinder 220 is communicated with the second cavity 210 to generate a negative pressure in the second cavity 210 when the cylinder 220 works.

In this embodiment, the cylinder 220 can generate the negative pressure in the second cavity 210 under the driving of the driving mechanism 230. Secondly, since the cylinder 220 is driven by the driving mechanism 230, a user can control the start or stop of the driving mechanism 230 to control the cylinder 220 to work or not work, so as to meet the needs of different cases. In addition, the cylinder 220 has good sealing performance. Therefore, when the extracted gas is stored in the cylinder 220, the pressure intensity and atmospheric pressure of the first cavity 110 can remain stably unchanged.

It should be noted that the driving mode of the driving mechanism 230 has many implementations, such as manual driving. The structure of the cylinder 220 needs to match the driving mode of the driving mechanism 230. Meanwhile, the driving mechanism 230 drives the cylinder 220 such that the intensity of the negative pressure generated by the second cavity 210 needs to reach a negative pressure intensity required by the negative pressure adsorption effect. The embodiment of the present disclosure does not limit the specific implementation of the driving mechanism 230 and the cylinder 220 which meet the above needs. To facilitate understanding, the embodiment of the present disclosure provides one implementation.

Referring to FIG. 1, the driving mechanism 230 adopts a motor 231. An output rotating shaft of the motor 231 is connected with a crank 232. The cylinder 220 includes a cylinder body 221, a piston 222 and a piston rod 223. The crank 232 is connected to and drives the piston rod 223. When the negative pressure mechanism 200 works, the motor 231 drives the piston 222 to move back and forth through the crank 232 to extract gas in the second cavity 210.

In this embodiment, the motor 231 is used for driving. The cylinder 220 can work according to actual needs by setting a working mode of the motor 231, so that the second cavity 210 can stably generate the negative pressure meeting the negative pressure intensity. Secondly, the motor 231 used for driving replaces the manual driving by a user, which is convenient. Meanwhile, the cylinder 220 uses the piston 222 and the piston rod 223, so that the piston 222 of the cylinder 220 moves under the driving of the driving mechanism 230, and the second cavity 210 generates the negative pressure and can withstand a high air pressure.

Optionally, there are many implementations for the crank 232, such as an axial connecting rod that is arranged on an outer side surface of a disk connected to a rotating shaft of the motor 231, or a crankshaft formed after the rotating shaft of the motor 231 outwards extends and is then reversely bent twice by 90 degrees, or a similar crank of a single-cylinder diesel engine, as long as this structure can convert a circumferential movement of rotation of the motor 231 into a linear back and forth movement. These structures can be collectively referred to as the crank 232 in the present disclosure.

It should be noted that the starting mechanism 300 starts the negative pressure mechanism 200, so that the time when the adsorption structure achieves the negative pressure adsorption effect is freely decided by the user. Therefore, the starting mechanism 300 needs to be provided with a switch type device. When the user needs to use the adsorption structure to achieve the negative pressure adsorption effect, the user can start the negative pressure mechanism 200 through the starting mechanism 300 to meet this need. The embodiment of the present disclosure does not limit the specific implementation of the switch type device provided for the starting mechanism 300. To facilitate understanding, the embodiment of the present disclosure provides one implementation.

Referring to FIG. 1, the starting mechanism 300 adopts a mechanical switch 310. An action portion 311 of the mechanical switch 310 is at least partially located on an outer side of a surface of the adsorption structure.

In this embodiment, the starting mechanism 300 adopts the mechanical switch 310, which can satisfy that the user freely decides the time when the adsorption structure achieves the negative pressure adsorption effect. At the same time, the action portion 311 of the mechanical switch 310 is arranged on a surface, which is convenient for the user to operate the mechanical switch 310 and also convenient for cooperation between the mechanical switch 310 and the adsorption member 100.

It should be noted that the mechanical switch 310 is a component frequently operated by the user when the user uses the adsorption structure. The user needs to simplify the way to use this component, so that when using the adsorption structure, the user only needs to closely contact the adsorption structure with other objects to achieve the negative pressure adsorption of the adsorption structure on other objects. The embodiment of the present disclosure does not limit the specific implementation of simplifying the use of the mechanical switch 310. To facilitate understanding, the embodiment of the present disclosure provides one implementation.

Referring to FIG. 1, the action portion 311 of the mechanical switch 310 is located inside or beside the adsorption member 100. An action direction of the mechanical switch 310 and an orientation of the opening of the adsorption member 100 are in the same direction, so that when the adsorption structure is close to the adsorbed object, the action portion 311 is pressed by the adsorbed object to act to start the negative pressure mechanism 200.

In this embodiment, the action portion 311 of the mechanical switch 310 is located inside or beside the adsorption member 100, and the action direction of the mechanical switch 310 and the orientation of the opening of the adsorption member 100 are in the same direction, so that the user can start the negative pressure mechanism 200 immediately after the adsorption structure closely contacts other objects, thus achieving the negative pressure adsorption of the adsorption structure on other objects. The user does not need to operate the mechanical switch 310 independently, which simplifies the way of using the mechanical switch 310.

It should be noted that in the adsorption process, other objects adsorbed are often loosened by an external force. Therefore, the adsorption structure needs to adsorb other objects under the negative pressure after it closely contacts other objects. Furthermore, when other objects adsorbed to be adsorbed are loosened in the adsorption process, the adsorption structure can also restart the negative pressure mechanism 200 to tightly adsorb other objects. The embodiment of the present disclosure does not limit the specific implementation meeting the above requirement. To facilitate understanding, the embodiment of the present disclosure provides one implementation.

Referring to FIG. 1, the mechanical switch 310 adopts a bidirectional starting switch. The mechanical switch 310 is used for switching on and starting the negative pressure mechanism 200 when the action portion 311 is pressed and released, so as to automatically start the negative pressure mechanism 200 when the adsorbed object is loosened.

In this embodiment, the mechanical switch 310 adopts a bidirectional starting switch. The negative pressure mechanism 200 is started when the action portion 311 is pressed or released. Therefore, when other objects adsorbed are loosened, the action portion 311 of the mechanical switch 310 is released, thus starting the negative pressure mechanism 200, so that the adsorption structure adsorbs other objects tightly. In this way, when the adsorption structure is required to adsorb other objects, the adsorption structure only needs to be in close contact with other objects. When other objects adsorbed are loosened, the negative pressure mechanism 200 is automatically started to adsorb other objects tightly to the adsorption structure. Finally, the adsorbed objects are stably and fixedly adsorbed to the adsorption structure before the user releases the adsorbed objects through the release mechanism 400.

It should be noted that the mechanical switch 310 starts the negative pressure mechanism 200 when the adsorption structure is in close contact with other objects, and the mechanical switch 310 starts the negative pressure mechanism 200 when other objects adsorbed are loosened. The above two needs are achieved by pressing or releasing the action portion 311 of the mechanical switch 310 and cooperating it with a component of the mechanical switch 310. The embodiment of the present disclosure does not limit the specific implementation of achieving the above needs by pressing or releasing the action portion 311 of the mechanical switch 310 and cooperating it with a component of the mechanical switch 310. To facilitate understanding, the embodiment of the present disclosure provides two preferable implementations: Embodiment I and Embodiment II.

Embodiment I

Figure 2:
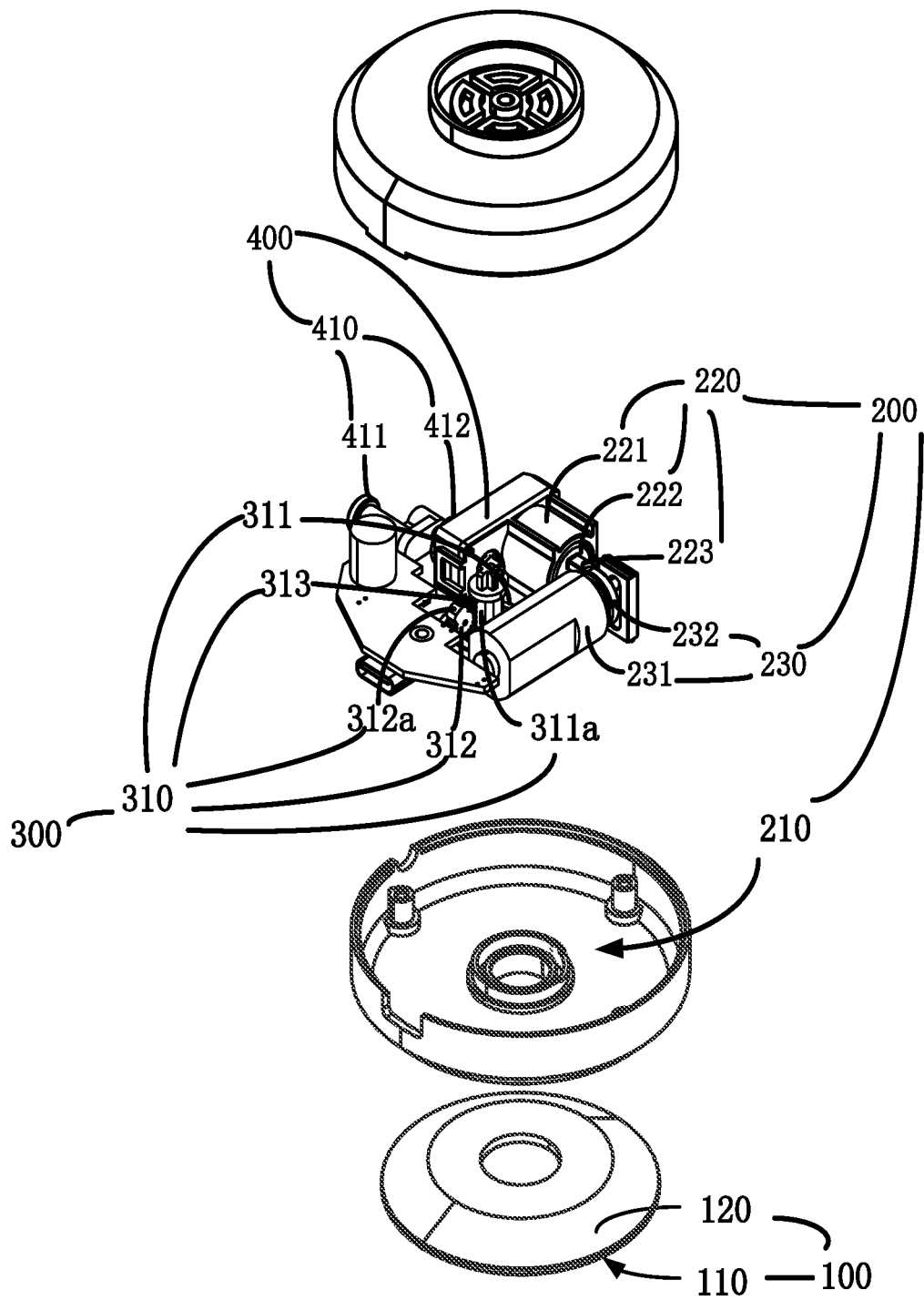
FIG. 2 is another exploded diagram of an adsorption structure according to an embodiment of the present disclosure.

Referring to FIG. 2, the action portion 311 is provided with a rack 311a. The mechanical switch 310 further includes a micro switch 313 and a gear 312 meshed with the rack 311a. A bulge 312a is arranged on a circumference of the gear 312. When the action portion 311 acts, the bulge 312a is used for triggering the micro switch 313 to start the negative pressure mechanism 200. Therefore, the negative pressure mechanism 200 can be started by pressing of the bulge 312a and the micro switch 313 when the gear 312 swings forwards and backwards.

In this embodiment, the rack 311a of the action portion 311 drives the gear 312 meshed with the rack 311a to enable the gear 312 to work. By the use of the rack 311a and the gear 312, when the action portion 311 is pressed or released, the bulge 312a on the circumference of the gear 312 will move to the micro switch 313, and the bulge 312a will trigger the micro switch 313, so that the mechanical switch 310 starts the negative pressure mechanism 200 when the adsorption structure is in close contact with other objects, and the mechanical switch 310 also starts the negative pressure mechanism 200 when other objects adsorbed are loosened.

Embodiment II

As shown in FIG. 1, the mechanical switch 310 is a travel switch 314. The travel switch 314 is used for starting the negative pressure mechanism 200 when the action portion 311 reaches a preset position.

In this embodiment, when the action portion 311 moves to a specific position of a preset travel, the travel switch 314 starts the negative pressure mechanism 200. At the same time, the specific position is set on two round-trip travels of the action portion 311. Therefore, when the action portion 311 moves to one of the specific positions, the travel switch 314 starts the negative pressure mechanism 200. Thus, the mechanical switch 310 starts the negative pressure mechanism 200 when the adsorption structure is in close contact with other objects, and the mechanical switch 310 also starts the negative pressure mechanism 200 when other objects adsorbed are loosened.

In the process of adsorbing other objects by the adsorption structure, other objects continue to press the action portion 311 that moves to the specific position, so that the action portion 311 moves to an end point of the travel. The negative pressure mechanism 200 is stopped working when the action portion 311 moves to the end point of the travel.

It should be noted that the mechanical switch 310 is required to start the negative pressure mechanism 200 when the action portion 311 reaches the preset position, and the mechanical switch 310 is required to stop the negative pressure mechanism 200 when the action portion 311 does not reach the preset position. The embodiment of the present disclosure does not limit the specific implementation meeting the above requirements. To facilitate understanding, the embodiment of the present disclosure provides one implementation.

Figure 8:
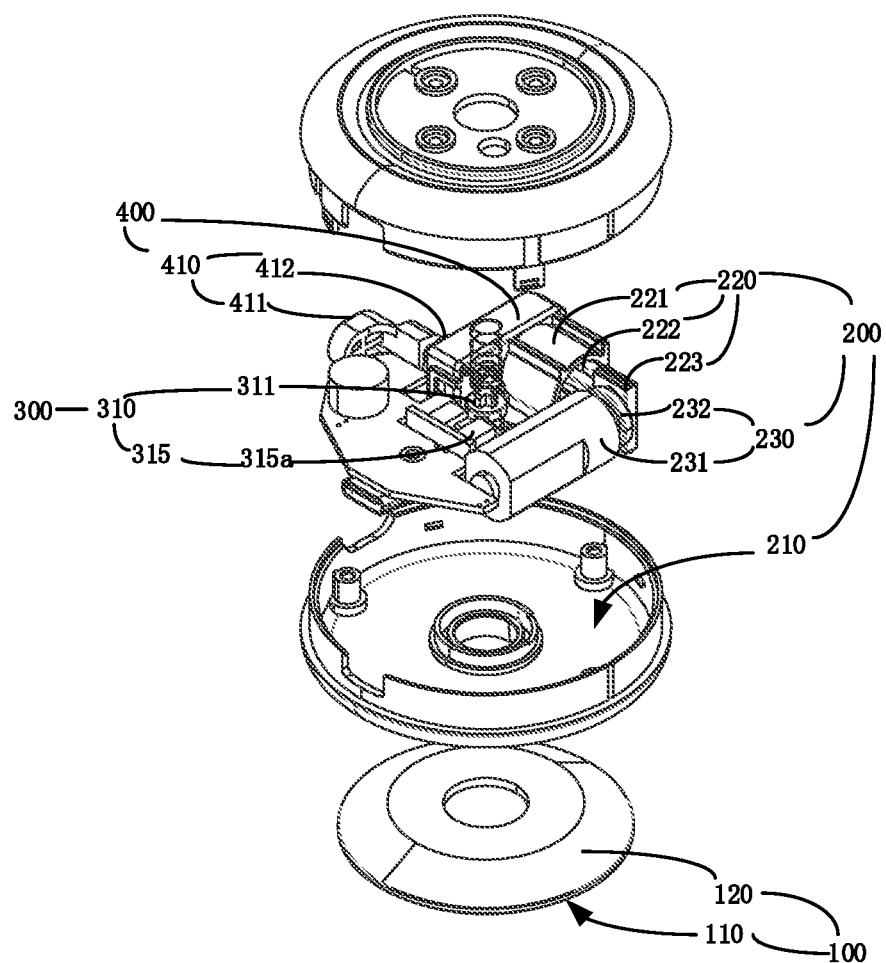
FIG. 8 is another exploded diagram of an adsorption structure according to an embodiment of the present disclosure.
Figure 9:
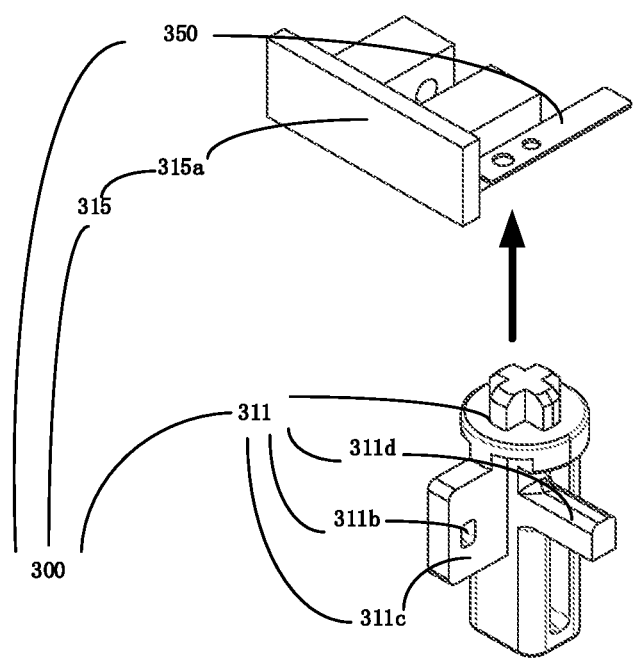
FIG. 9 is a schematic diagram of cooperation of a photoelectric sensing and triggering portion, an action portion and a starting switch in an adsorption structure according to an embodiment of the present disclosure.

Referring to FIG. 8 and FIG. 9, the mechanical switch 310 includes a photoelectric sensing and triggering portion 315. The action portion includes a light passing hole 311b or a light shielding portion 311c. The photoelectric sensing and triggering portion 315 includes a photoelectric sensor 315a. When the light passing hole 311b or the light shielding portion 311c is detected, the photoelectric sensing and triggering portion 315 is used for triggering the switch to start the negative pressure mechanism.

The action portion 311 in FIG. 8 has various implementations, and FIG. 9 shows another implementation of the action portion 311.

In this embodiment, when the action portion 311 reaches the preset position, light passes through the light passing hole 311b. The photoelectric sensing and triggering portion 315 detects the light passing through the light passing hole 311b, and the mechanical switch 310 starts the negative pressure mechanism 200. When the action portion 311 does not reach the preset position, light is shielded by the light shielding portion 311c. The photoelectric sensing and triggering portion 315 detects that the light is shielded by the light shielding portion 311c, and the mechanical switch 310 stops the negative pressure mechanism 200. Thus, the mechanical switch 310 starts the negative pressure mechanism 200 when the action portion 311 reaches the preset position, and the mechanical switch 310 stops the negative pressure mechanism 200 when the action portion 311 does not reach the preset position.

It should be noted that the photoelectric sensing and triggering portion 315 works with electric energy. In order to save the electric energy, the photoelectric sensing and triggering portion 315 is required to work or stop working according to actual needs. The embodiment of the present disclosure does not limit the specific implementation meeting the above requirements. To facilitate understanding, the embodiment of the present disclosure provides one implementation.

Referring to FIG. 8 and FIG. 9, the photoelectric sensing and triggering portion 315 is connected with a starting switch 350. The starting switch 350 in the figure is an action component of the starting switch. Other portions of the switch are omitted in the figure. The embodiment does not limit the specific structure of the starting switch 350. The starting switch 350 is used for switching on a power supply circuit of the photoelectric sensing and triggering portion 315 when the action portion acts. The action portion includes a push portion 311d. The push portion 311d is arranged on one side of the starting switch 350. The push portion 311d is used for pushing the starting switch 350 when the action portion acts.

In this embodiment, photoelectric sensing and triggering portion 315 is connected with the starting switch 350. The starting switch 350 is used for switching on the power supply circuit of the photoelectric sensing and triggering portion 315 when the action portion acts. The action portion includes the push portion 311d. The push portion 311d is used for pushing the starting switch 350 when the action portion acts. The action portion includes the push portion 311d. When the action portion acts, the push portion 311d pushes the starting switch 350, and the starting switch 350 switches on the power supply circuit of the photoelectric sensing and triggering portion 315, so that the photoelectric sensing and triggering portion 315 works. At the same time, when the push portion 311d does not push the starting switch 350, the starting switch 350 switches off the power supply circuit of the photoelectric sensing and triggering portion 315, so that the photoelectric sensing and triggering portion 315 stops working. Thus, the photoelectric sensing and triggering portion 315 works or stops working as required according to whether the starting switch 350 pushes the push portion 311d, thus saving the electric energy.

Optionally, the photoelectric sensing and triggering portion 315 satisfies the above functions, which can be achieved in various ways. To facilitate understanding, the following is an example.

The photoelectric sensing and triggering portion 315 includes a bijection tube which is arranged on both sides of the light passing hole 311b or the light shielding portion 311c of the action portion. When the adsorption structure adsorbs other objects, other objects press the action portion, and the action portion acts. The push portion 311d pushes the starting switch 350 to enable the photoelectric sensing and triggering portion 315 to work, so that the bijection tube generates light. When the action portion 311 acts to make the light passing hole 311b move to a position where the light can pass through the light passing hole 311b, the photoelectric sensing and triggering portion 315 detects the light passing through the light passing hole 311b, so that the mechanical switch 310 starts the negative pressure mechanism 200. When the action portion 311 makes the light shielding portion 311c move to a position where the light is shielded, the photoelectric sensing and triggering portion 315 detects that the light is shielded, and the mechanical switch 310 stops the negative pressure mechanism 200.

It should be noted that the starting mechanism 300 can be implemented in other ways in addition to the mechanical switch 310. The embodiment of the present disclosure does not limit other implementations of the starting mechanism 300. To facilitate understanding, the embodiment of the present disclosure provides three preferred implementations, including implementation I: touch-control switch; implementation II: magnetically controlled switch 330; and implementation III: sensor switch 340.

Implementation I: Touch Control Switch

Referring to FIG. 1, the starting mechanism 300 adopts a touch-control switch. A touch-control portion of the touch-control switch is arranged on a side surface of the adsorption structure.

In this embodiment, the touch-control switch is arranged on the side surface of the adsorption structure, which enables a user to easily start the touch-control switch when the adsorption structure needs to adsorb other objects.

Implementation II: Magnetically Controlled Switch 330

Figure 4:
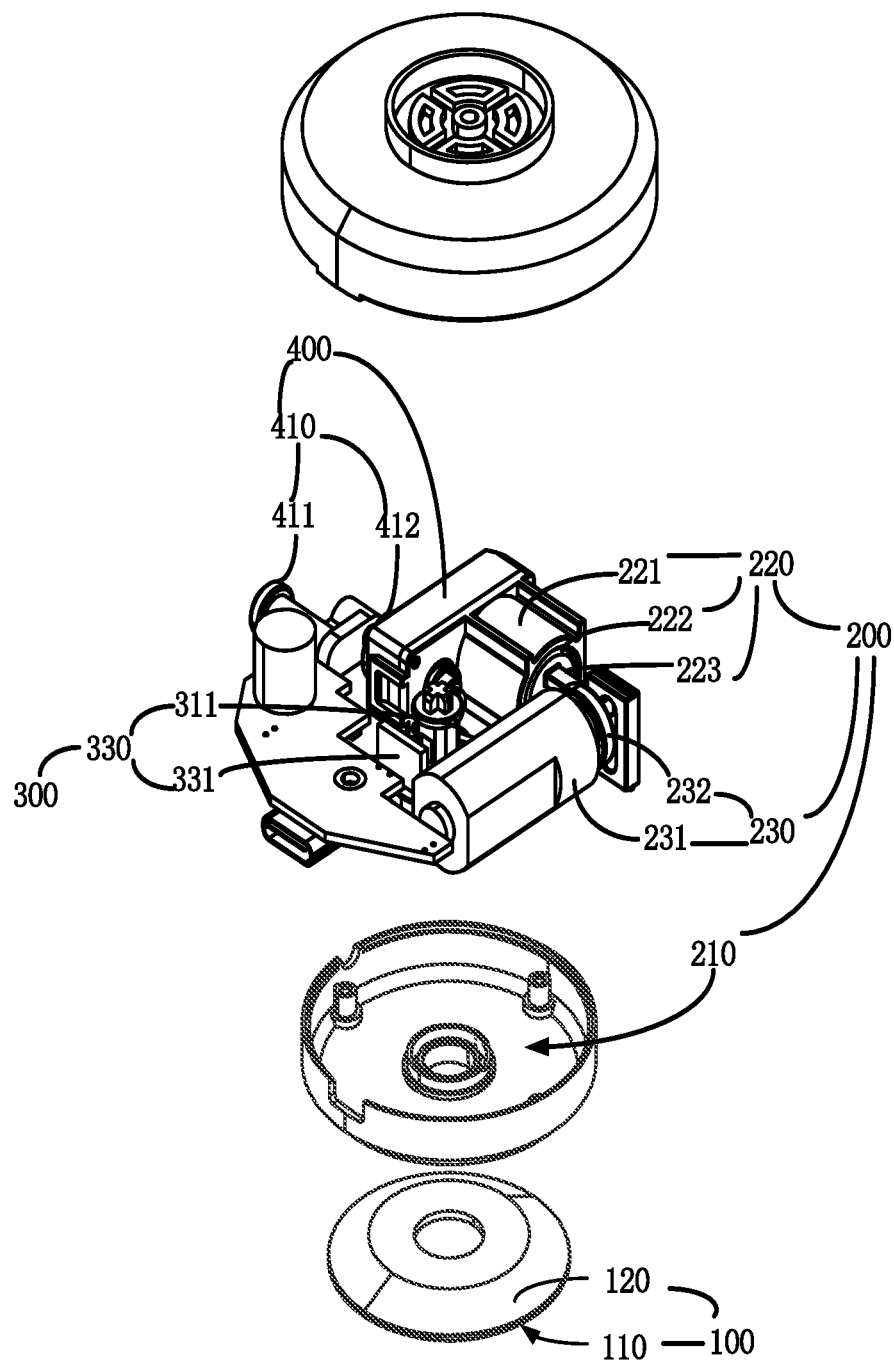
FIG. 4 is another exploded diagram of an adsorption structure according to an embodiment of the present disclosure.

Referring to FIG. 4, the starting mechanism 300 adopts a magnetically controlled switch 330. The magnetically controlled switch 330 includes an action portion 311 and a fixed portion 331. One of the action portion 311 and the fixed portion 331 is provided with a hall sensor, and the other one of the action portion and the fixed portion is provided with a magnet. The action portion 311 is used for contacting an object to be adsorbed and is pushed by the object to be adsorbed. The magnetically controlled switch 330 is used for starting and stopping the negative pressure mechanism 200 according to a magnetic field intensity detected by the hall sensor.

In this embodiment, when other objects to be adsorbed push the action portion 311, a distance between the magnet and the hall sensor changes, so the value of the magnetic field intensity detected by the hall sensor will also change. Since the hall sensor can detect the change of the value of magnetic field intensity acutely, the starting mechanism 300 can quickly and acutely start the negative pressure mechanism 200.

Implementation III: Sensor Switch 340

Figure 3:
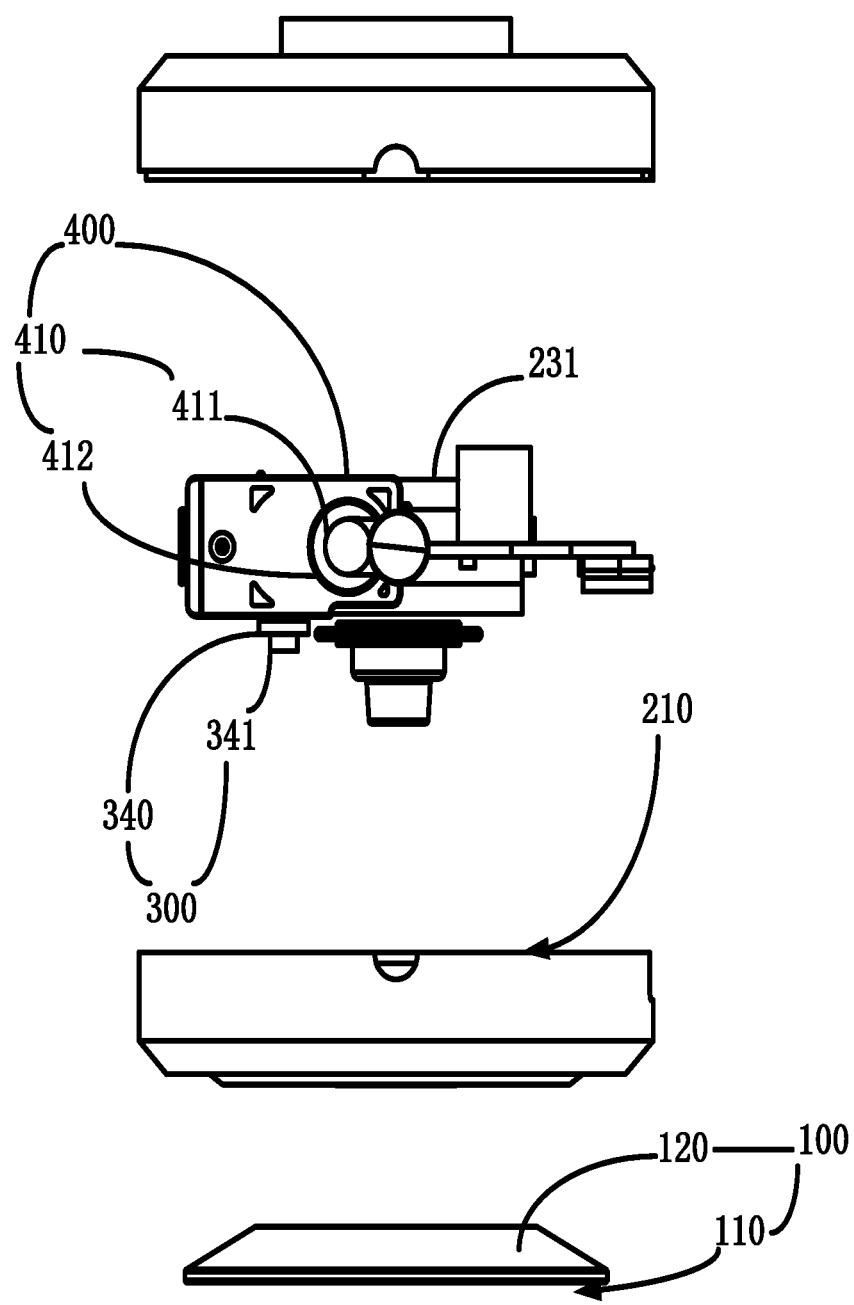
FIG. 3 is another exploded diagram of an adsorption structure according to an embodiment of the present disclosure.

Referring to FIG. 3, the starting mechanism 300 adopts a sensor switch 340; The sensor switch 340 includes a sensor component 341. The sensor component 341 is at least one of a photosensitive sensor, a distance sensor and an infrared sensor. The sensor component 341 is used for triggering the sensor switch 340 when covered, so as to start the negative pressure mechanism 200.

In this embodiment, when other objects are in close contact with the adsorption structure, other objects cover the sensor component 341, thus triggering the sensor switch 340, and the sensor switch 340 starts the negative pressure mechanism 200. The sensor component 341 has a simple structure and a small volume, which makes the sensor switch 340 easily mounted on the adsorption structure.

It should be noted that for the convenience of the user, when other objects to be adsorbed are in close contact with the adsorption structure, the sensor component 341 of the sensor switch 340 needs to be able to sense other objects to be adsorbed and trigger the sensor switch 340, so as to start the negative pressure mechanism 200. The embodiment of the present disclosure does not limit the specific implementation satisfying the above function. To facilitate understanding, the embodiment of the present disclosure provides one implementation.

Figure 7:
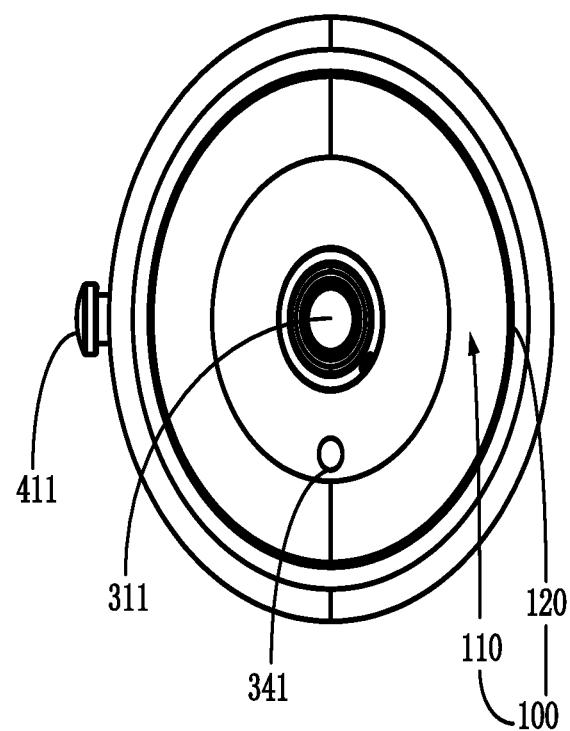
FIG. 7 is another schematic diagram of an adsorption structure according to an embodiment of the present disclosure.

Referring to FIG. 3 and FIG. 7, the sensor component 341 is arranged on a surface of the adsorption structure and is located on one side of the adsorption member 100, so that the sensor is covered when the object to be adsorbed is close to the adsorption member 100, thus starting the negative pressure mechanism 200.

In this embodiment, the sensor component 341 is located on the surface of the adsorption structure and on one side of the adsorption member 100. Therefore, when other objects to be adsorbed contact the adsorption member 100, other objects to be adsorbed can cover the sensor component 341, so that the sensor component 341 senses other objects to be adsorbed and triggers the sensor switch 340 to start the negative pressure mechanism 200.

It should be noted that the adsorption structure adopts negative pressure adsorption, so it is difficult to remove the adsorbed object without changing the pressure intensity and atmospheric pressure of the first cavity 110. To remove other objects adsorbed on the adsorption structure, the user needs to remove the adsorbed object conveniently. The embodiment of the present disclosure does not limit the specific implementation meeting the above requirement. To facilitate understanding, the embodiment of the present disclosure provides one implementation.

Referring to FIG. 1, the release mechanism 400 includes a push switch 410. The push switch 410 includes a pressing portion 411 and a sealing portion 412. The pressing portion 411 is exposed from a surface of the adsorption structure. The sealing portion 412 is movably hermetically connected to an inner wall of the first cavity 110, so that the pressing portion 411 is pressed to open the first cavity 110 to balance the pressure intensity and atmospheric pressure in the first cavity 110.

In this embodiment, to remove the adsorbed object, the user can press the pressing portion 411 of the release mechanism 400 to enable the sealing portion 412 of the release mechanism 400 to open the first cavity 110 and balance the pressure intensity and atmospheric pressure in the first cavity 110. Thus, the adsorbed object is separated from the adsorption structure, and the user can conveniently remove the adsorbed object.

It should be noted that after the starting mechanism 300 starts the negative pressure mechanism 200, the negative pressure mechanism 200 does not work continuously. The adsorption structure needs to stop the negative pressure mechanism 200 when it adsorbs other objects tightly, so as to save the energy. The embodiment of the present disclosure does not limit the specific implementation meeting the above requirement. To facilitate understanding, the embodiment of the present disclosure provides one implementation.

Figure 5:
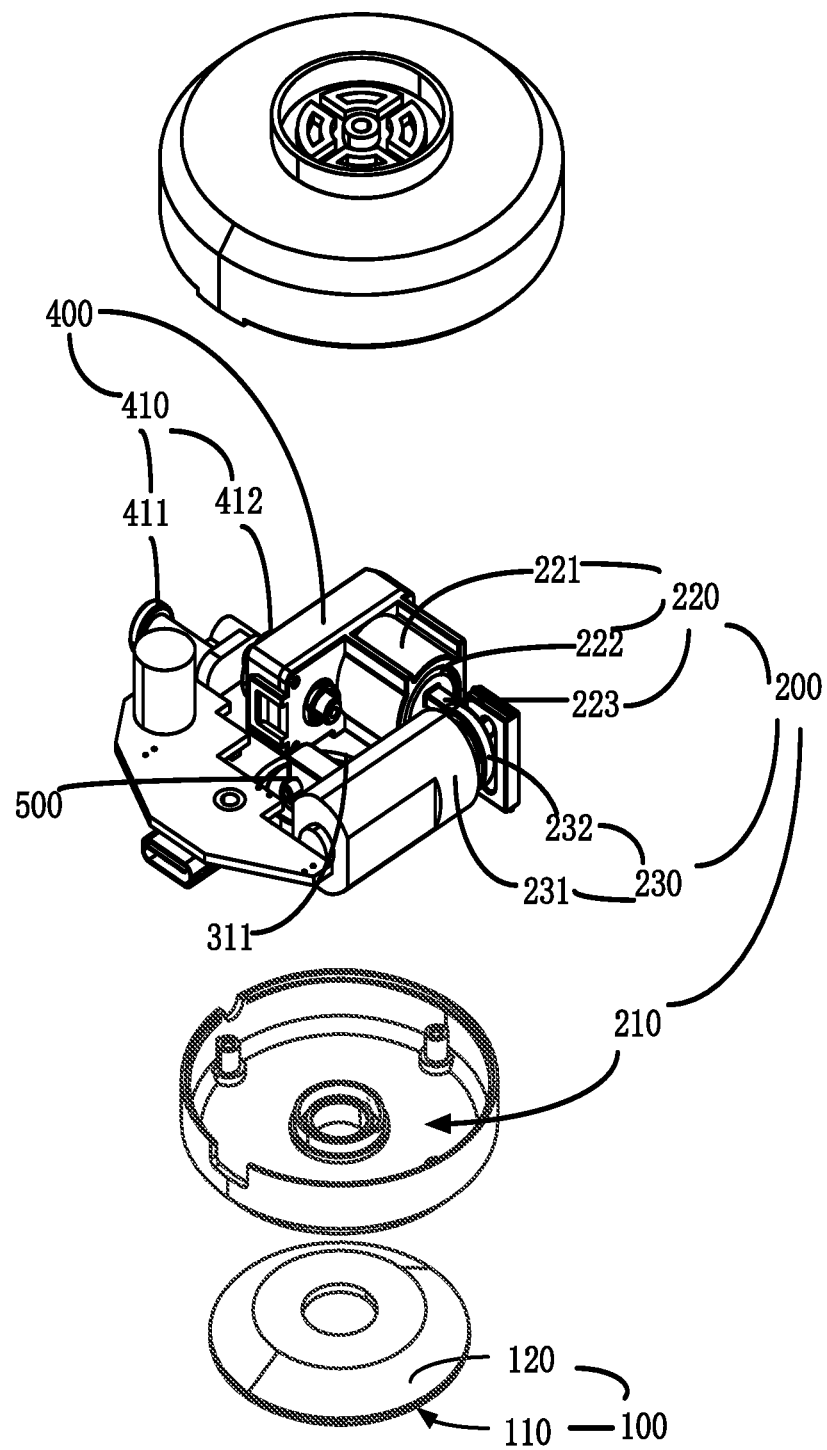
FIG. 5 is another exploded diagram of an adsorption structure according to an embodiment of the present disclosure.

Referring to FIG. 5, the adsorption structure further includes a pressure detection switch 500. The pressure detection switch 500 is arranged in the second cavity 210 or on a side wall of the second cavity 210, so as to stop the negative pressure mechanism 200 when a pressure intensity in the second cavity 210 reaches a first preset value.

In this embodiment, the first preset value is a pressure intensity of the second cavity 210 when the adsorption structure adsorbs other objects tightly. Therefore, when the pressure intensity in the second cavity 210 reaches the first preset value, the negative pressure mechanism 200 is stopped working, so that the adsorption structure can adsorb other objects tightly, and also save the energy.

Optionally, there are the following specific implementations meeting the above requirements in addition to the above embodiments.

A timing device is arranged in the negative pressure mechanism 200, and the timing device presets a stop time point. The timing device starts timing when the starting mechanism 300 starts the negative pressure mechanism 200. The negative pressure mechanism 200 stops working when the time counted by the timing device reaches the stop time point. At the same time, the adsorption structure adsorbs other objects tightly. The timing device may be either an actual timer or a virtual or equivalent timing device, as long as the negative pressure mechanism 200 can be controlled to be stopped after being started for certain time.

It should be noted that in other embodiments, the start and stop of the negative pressure mechanism 200 can also be controlled in the form of pressure intensity monitoring by means of setting the pressure detection switch 500. For example, a first preset value of the pressure intensity is set. After the negative pressure mechanism 200 is started, when the pressure detection switch 500 monitors that the pressure intensity in the first cavity 110 or the second cavity 210 reaches the first preset value, the negative pressure mechanism 200 is controlled to stop working.

In a further embodiment, a second preset value may also be set. When the pressure detection switch 500 detects that the pressure intensity in the first cavity 110 or the second cavity 210 changes from the first preset value to the second preset value, the negative pressure mechanism 200 is started until the pressure intensity in the first cavity 110 or the second cavity 210 reaches the first preset value.

It should be noted that when the pressure intensity reaches the first preset value or the second preset value, the adsorption mechanism can achieve a stable adsorption effect, and the first preset value is less than the second preset value and the atmospheric pressure.

In this embodiment, by the arrangement of the pressure detection switch 500, when the adsorption effect becomes slightly worse, the negative pressure mechanism 200 can be started to enhance the adsorption effect, so as to ensure a continuous and stable adsorption effect.

To sum up, the adsorption structure provided in the embodiments of the present disclosure can stably and fixedly adsorb other objects. Meanwhile, the user can independently decide to adsorb or release other objects, and can easily remove other objects adsorbed.

What is claimed is:

1. An adsorption structure, comprising:
   an adsorption member, used for adsorbing other objects, wherein a first cavity provided with an opening is formed in the adsorption member; the opening of the first cavity is used for forming a sealing structure with surfaces of other objects;
   a negative pressure mechanism, wherein the negative pressure mechanism is provided with a second cavity for generating a negative pressure, and the second cavity is communicated with the first cavity;
   a starting mechanism, used for starting the negative pressure mechanism; and
   a release mechanism, used for balancing a pressure intensity in the first cavity and an atmospheric pressure to enable the adsorption member to release an adsorbed object.

2. The adsorption structure according to claim 1, wherein the adsorption member adopts a suction cup, and a through hole communicated with the second cavity is formed in a bottom of the suction cup.

3. The adsorption structure according to claim 1, wherein the negative pressure mechanism comprises a cylinder and a driving mechanism for driving the cylinder; the cylinder is communicated with the second cavity; and when working, the cylinder enables the second cavity to generate a negative pressure.

4. The adsorption structure according to claim 3, wherein the driving mechanism adopts a motor; an output rotating shaft of the motor is connected with a crank; the cylinder comprises a cylinder body, a piston and a piston rod; the crank is connected to and drives the piston rod; and when the negative pressure mechanism works, the motor drives the piston to move back and forth through the crank to extract gas in the second cavity.

5. The adsorption structure according to claim 1, wherein the starting mechanism adopts a mechanical switch; and an action portion of the mechanical switch is at least partially located on an outer side of a surface of the adsorption structure.

6. The adsorption structure according to claim 5, wherein the action portion of the mechanical switch is located inside or beside the adsorption member; and an action direction of the mechanical switch and an orientation of the opening of the adsorption member are in the same direction, so that when the adsorption structure is close to the adsorbed object, the action portion is pressed by the adsorbed object to act to start the negative pressure mechanism.

7. The adsorption structure according to claim 6, wherein the mechanical switch adopts a bidirectional starting switch; and the mechanical switch is used for switching on and starting the negative pressure mechanism when the action portion is pressed and released, so as to automatically start the negative pressure mechanism when the adsorbed object is loosened.

8. The adsorption structure according to claim 7, wherein the action portion is provided with a rack; the mechanical switch further comprises a micro switch and a gear meshed with the rack; a bulge is arranged on a circumference of the gear; and when the action portion acts, the bulge is used for triggering the micro switch to start the negative pressure mechanism.

9. The adsorption structure according to claim 7, wherein the mechanical switch is a travel switch; and the travel switch is used for starting the negative pressure mechanism when the action portion reaches a preset position.

10. The adsorption structure according to claim 9, wherein the mechanical switch comprises a photoelectric sensing and triggering portion; the action portion comprises a light passing hole or a light shielding portion; the photoelectric sensing and triggering portion comprises a photoelectric sensor; and when the light passing hole or the light shielding portion is detected, the photoelectric sensing and triggering portion is used for triggering the switch to start the negative pressure mechanism.

11. The adsorption structure according to claim 10, wherein the photoelectric sensing and triggering portion is connected with a starting switch; the starting switch is used for switching on a power supply circuit of the photoelectric sensing and triggering portion when the action portion acts; the action portion comprises a push portion; the push portion is arranged on one side of the starting switch; and the push portion is used for pushing the starting switch when the action portion acts.

12. The adsorption structure according to claim 1, wherein the starting mechanism adopts a touch-control switch; and a touch-control portion of the touch-control switch is arranged on a side surface of the adsorption structure.

13. The adsorption structure according to claim 1, wherein the starting mechanism adopts a magnetically controlled switch; the magnetically controlled switch comprises an action portion and a fixed portion; one of the action portion and the fixed portion is provided with a hall sensor, and the other one of the action portion and the fixed portion is provided with a magnet; the action portion is used for contacting an object to be adsorbed and is pushed by the object to be adsorbed; and the magnetically controlled switch is used for starting and stopping the negative pressure mechanism according to a magnetic field intensity detected by the hall sensor.

14. The adsorption structure according to claim 1, wherein the starting mechanism adopts a sensor switch; the sensor switch comprises a sensor component; the sensor component is at least one of a photosensitive sensor, a distance sensor and an infrared sensor; and the sensor component is used for triggering the sensor switch when covered, so as to start the negative pressure mechanism.

15. The adsorption structure according to claim 14, wherein the sensor component is arranged on a surface of the adsorption structure and is located on one side of the adsorption member, so that the sensor is covered when the object to be adsorbed is close to the adsorption member, thus starting the negative pressure mechanism.

16. The adsorption structure according to claim 1, wherein the release mechanism comprises a push switch; the push switch comprises a pressing portion and a sealing portion; the pressing portion is exposed from a surface of the adsorption structure; when the sealing portion is movably hermetically connected to an inner wall of the first cavity, so that when the pressing portion is pressed, the first cavity is opened to balance the pressure intensity in the first cavity and the atmospheric pressure.

17. The adsorption structure according to claim 1, wherein the adsorption structure further comprises a pressure detection switch; and the pressure detection switch is arranged in the second cavity or on a side wall of the second cavity, so as to stop the negative pressure mechanism when a pressure intensity in the second cavity reaches a first preset value.

18. The adsorption structure according to claim 17, wherein the pressure detection switch is further used for starting the negative pressure mechanism when the pressure intensity in the second cavity changes from the first preset value into a second preset value.

\* \* \* \* \*